US008492012B2

United States Patent
Lee et al.

(10) Patent No.: US 8,492,012 B2
(45) Date of Patent: Jul. 23, 2013

(54) SECONDARY BATTERY HAVING DISCRETE CIRCUIT MODULES

(75) Inventors: Sangjoo Lee, Suwon-si (KR); Heuisang Yoon, Suwon-si (KR); Woochul Kim, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 327 days.

(21) Appl. No.: 12/805,800

(22) Filed: Aug. 19, 2010

(65) Prior Publication Data

US 2011/0076520 A1 Mar. 31, 2011

(30) Foreign Application Priority Data

Sep. 29, 2009 (KR) .................. 10-2009-0092315

(51) Int. Cl.
*H01M 14/00* (2006.01)
(52) U.S. Cl.
USPC .............. 429/7; 429/65; 429/161; 429/178; 429/185
(58) Field of Classification Search
USPC .............. 429/7, 61, 65, 161, 178, 211, 181, 429/185
See application file for complete search history.

(56) References Cited

U.S. PATENT DOCUMENTS

| 2003/0108780 | A1 | 6/2003 | Iwaizono et al. |
| 2008/0160398 | A1 | 7/2008 | Kim |
| 2008/0226980 | A1 | 9/2008 | Kim |
| 2009/0186268 | A1* | 7/2009 | Song .......................... 429/163 |

FOREIGN PATENT DOCUMENTS

| KR | 10-2001-0043946 A | 5/2001 |
| KR | 10-0791551 B1 | 12/2007 |
| KR | 10-0851963 B1 | 8/2008 |
| KR | 1020080084237 A | 9/2008 |
| KR | 10-0907636 B1 | 7/2009 |
| KR | 1020090078181 A | 7/2009 |
| WO | 2009/025433 A1 | 2/2009 |

OTHER PUBLICATIONS

Korean Office Action issued by KIPO, dated Mar. 8, 2011, corresponding to Korean Patent Application No. 10-2009-0092315, together with Request for Entry.
Korean Notice of Allowance issued by KIPO on Oct. 21, 2011, corresponding to Korean Patent Application No. 10-2009-0092315 and Request for Entry attached herewith.

* cited by examiner

*Primary Examiner* — Raymond Alejandro
(74) *Attorney, Agent, or Firm* — Robert E. Bushnell, Esq.

(57) ABSTRACT

Disclosed is a secondary battery that includes a bare cell, a first circuit module, and a second circuit module. The bare cell includes an electrode terminal connected to one type of polarity of the battery and a plate terminal connected to another type of polarity of the battery. The first and second circuit modules are disposed on an upper surface of the plate terminal, and are disposed at opposite sides of the electrode terminal. External terminals, which are mounted on the second circuit module and are electrically coupled to an external device, are positioned higher than the electrode terminal. This structure of the battery minimizes the size of the battery.

18 Claims, 2 Drawing Sheets

SECONDARY BATTERY HAVING DISCRETE CIRCUIT MODULES

CLAIM OF PRIORITY

This application makes reference to, incorporates the same herein, and claims all benefits accruing under 35 U.S.C. §119 from an application earlier filed in the Korean Intellectual Property Office on 29 Sep. 2009 and there duly assigned Serial No. 10-2009-0092315.

BACKGROUND OF THE INVENTION

1. Field of the Invention

Embodiments of the present invention relate to a secondary battery.

2. Description of the Related Art

Recently, as electronic devices, communication devices, and computer devices are rapidly developed, portable electronic appliances are being widely used. In addition, rechargeable secondary batteries are being typically used as power sources of the portable electronic appliances.

Pack-type secondary batteries are being widely used. Such a pack-type secondary battery includes a bare cell for supplying electrical energy, and a protection circuit module (PCM) for stably controlling charging and discharging.

The bare cell is spaced apart from the PCM, as a space is required for an electrical connection structure between the bare cell and PCM, and insulation structures are required between elements of the battery. The space between the bare cell and the PCM, however, increases the size of a secondary battery.

SUMMARY OF THE INVENTION

Embodiments of the present invention are therefore directed to a secondary battery, which substantially overcome one or more of the problems, which are due to the limitations and disadvantages of the related art.

It is therefore a feature of an embodiment to provide a secondary battery that minimizes the distances between a bare cell and circuit modules.

It is therefore a feature of another embodiment to provide a secondary battery having a small size, particularly, a small height.

At least one of the above and other features and advantages may be realized by providing a secondary battery including a bare cell including an electrode terminal for supplying electricity, a first and second circuit modules disposed on the upper surface of the bare cell, a protection circuit module (PCM) mounted on the first circuit module, and an external terminal mounted on the second circuit module. The first circuit module is disposed at a first side of the electrode terminal, and the second module is disposed at a second side of the electrode terminal. The external terminal is positioned higher than the electrode terminal.

At least one of the above and other features and advantages may be realized by providing a secondary battery including a bare cell including an electrode terminal for supplying electricity, a first and second circuit modules disposed on an upper surface of the bare cell, a protection circuit module (PCM) mounted on the first circuit module, an external terminal mounted on the second circuit module, and a first connection tab electrically connecting the first circuit module to the electrode terminal. The first circuit module is disposed at a first side of the electrode terminal, and the second circuit module is disposed at a second side of the electrode terminal.

The bare cell may include an electrode assembly including a first electrode, a second electrode, and a separator disposed between the first and second electrodes; a can accommodating the electrode assembly; a cap plate disposed on the electrode assembly; and a secondary protective device electrically connected between the first electrode and the electrode terminal. The cap plate may include the electrode terminal and a plate terminal electrically insulated from the electrode terminal. The electrode terminal is electrically connected to the first electrode, and the plate terminal is electrically connected to the second electrode.

The secondary battery may further include a connection member coupling the second circuit module to the plate terminal of the cap plate. The connection member may maintain a gap between the second circuit module and the plate terminal.

The secondary battery may further include a first insulating tape disposed between the second circuit module and the upper surface of the bare cell. The first insulating tape may attach the second circuit module to the upper surface of the bare cell. The first insulating tape may maintain a gap between the second circuit module and the upper surface of the bare cell.

The secondary battery may further include a second insulating tape disposed between the first circuit module and the upper surface of the bare cell. The second insulating tape may attach the first circuit module to the upper surface of the bare cell.

The secondary battery may further include a second connection tab electrically connecting the first circuit module to the second circuit module. The second connection tab is spaced apart from the first connection tab.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
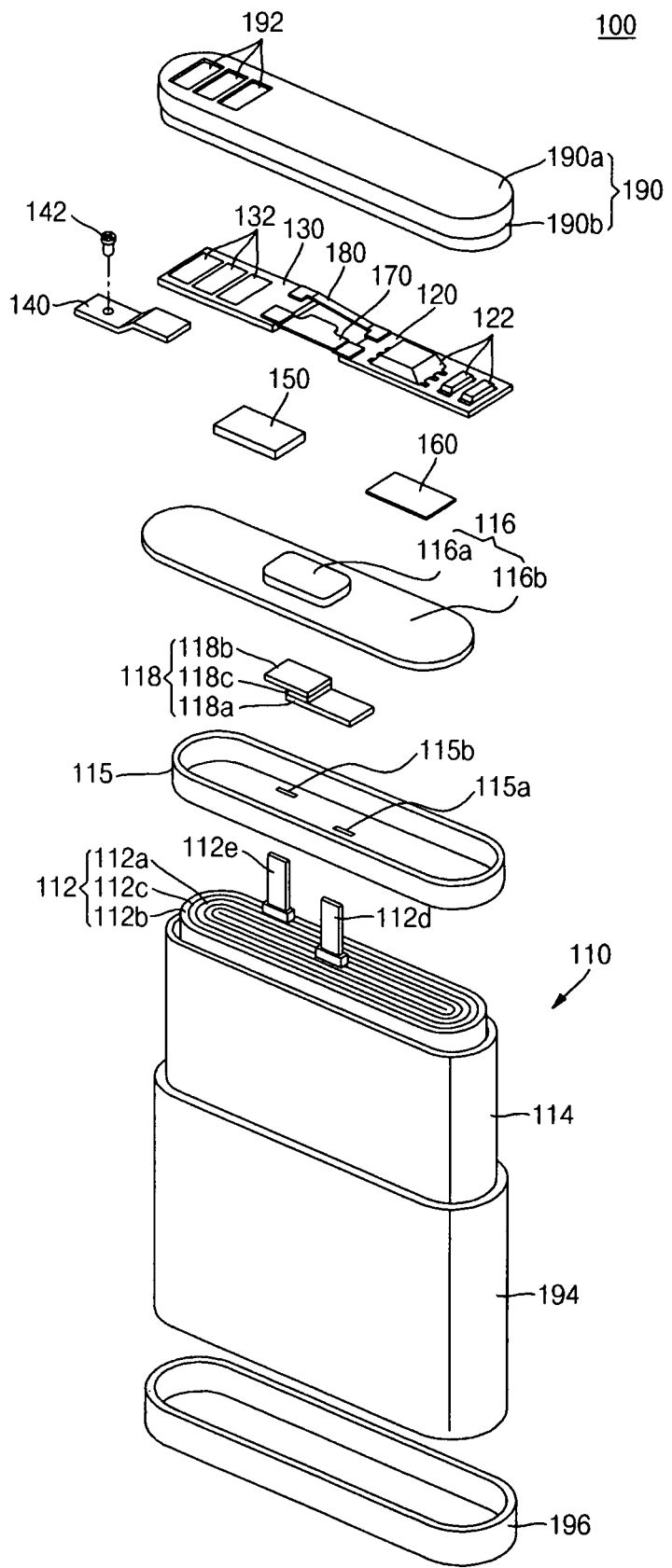
FIG. 1 is an exploded perspective view illustrating a secondary battery constructed according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Like reference numerals denote like elements throughout.

Hereinafter, embodiments will be described in detail with reference to the accompanying drawings.

Figure 2:
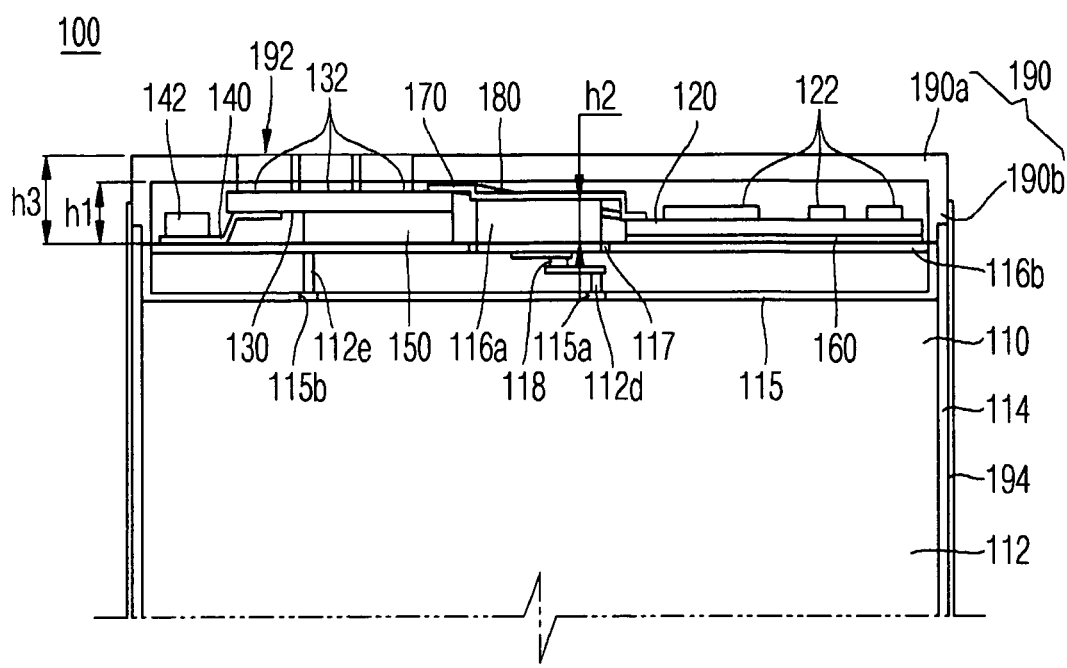
FIG. 2 is a cross-sectional view illustrating a portion of the secondary battery shown in FIG. 1.

FIG. 1 is an exploded perspective view illustrating a secondary battery 100 according to an embodiment. FIG. 2 is a cross-sectional view illustrating the secondary battery 100. Referring to FIGS. 1 and 2, the secondary battery 100 includes a bare cell 110, a first circuit module 120, and a second circuit module 130.

The bare cell 110 includes an electrode assembly 112 that includes a first electrode 112a, a second electrode 112b, and a separator 112c interposed between the first and second electrodes 112a and 112b.

The electrode assembly 112 may be wound into a jelly roll shape as illustrated in FIG. 1. Alternatively, the electrode assembly 112 may have a stack structure in which a first electrode, a separator, and a second electrode are stacked, but is not limited thereto, provided that the electrode assembly 112 includes a first electrode, a separator, and a second electrode.

The electrode assembly 112 may include electrolyte (not shown). The first electrode 112a may be a negative electrode, and the second electrode 112b may be a positive electrode. Alternatively, the first electrode 112a may be a positive electrode, and the second electrode 112b may be a negative electrode. In the current embodiment, the first electrode 112a may be a negative electrode, and the second electrode 112b may be a positive electrode, for convenience in description.

The electrode assembly 112 includes a first electrode tab 112d extending from the first electrode 112a, and a second electrode tab 112e extending from the second electrode 112b.

The electrode assembly 112 is accommodated in a can 114 having an open upper surface.

An insulation case 115 covers the upper surface of the can 114 accommodating the electrode assembly 112. The insulation case 115 prevents the electrode assembly 112 from moving in the can 114, and electrically insulates the electrode assembly 112 from a cap plate 116. The insulation case 115 includes a first through hole 115a and a second through hole 115b through which the first electrode tab 112d and the second electrode tab 112e respectively pass.

The bare cell 110 includes the can 114 accommodating the electrode assembly 112, and the cap plate 116 disposed on the upper surface of the can 114.

The cap plate 116 includes an electrode terminal 116a formed in a region of the cap plate 116, and a plate terminal 116b formed in the rest region of the cap plate 116 except for the electrode terminal 116a. The electrode terminal 116a and the plate terminal 116b are electrically insulated from each other by an insulation gasket 117.

The electrode terminal 116a is connected to one of the first electrode tab 112d and the second electrode tab 112e. The plate terminal 116b is connected to the other of the first and second electrode tabs 112d and 112e, which are not connected to the electrode terminal 116a. For convenience in description, the electrode terminal 116a is connected to the first electrode tab 112d, and the plate terminal 116b is connected to the second electrode tab 112e in the current embodiment.

A secondary protective device 118 may be disposed in the bare cell 110. The secondary protective device 118 prevents an overcurrent from flowing to the bare cell 110 while the bare cell 110 is charged or discharged. The secondary protective device 118 may be disposed between the first electrode tab 112d and the electrode terminal 116a as illustrated in FIG. 1.

The secondary protective device 118 includes a first lead 118a connected to the first electrode tab 112d, a second lead 118b connected to the electrode terminal 116a, and a positive temperature coefficient (PTC) device 118c disposed between the first and second lead 118a and 118b. The resistance of the PTC device 118c quickly increases as temperature increases. The PTC device 118c senses heat generated from the bare cell 110. The secondary protective device 118 may include a fuse (not shown).

The first circuit module 120 is disposed on an upper surface of the bare cell 110 or on an upper surface of the plate terminal 116b. The first circuit module 120 is also disposed on a first side with respect to the electrode terminal 116a. A protection circuit module (PCM) 122 for stably charging or discharging the bare cell 110 is mounted on the first circuit module 120.

The PCM 122 includes devices such as a control integrated circuit (IC) and a charge/discharge switch to control charge/discharge operations of the secondary battery 100.

The second circuit module 130 is disposed on an upper surface of the bare cell 110 or on an upper surface of the plate terminal 116b. The second circuit module 130 is also disposed on a second side with respect to the electrode terminal 116a. Therefore, as shown in FIGS. 1 and 2, the electrode terminal 116a may be positioned between the first circuit module 120 and the second circuit module 130, while the first and second circuit module 120 and 130 are disposed on the upper surface of the plate terminal 116b. One or more external terminals 132 for electrically connecting the bare cell 110 to an external power source or an external device are mounted on the second circuit module 130.

The second circuit module 130 is disposed such that outer surfaces (upper surfaces) of the external terminals 132 are positioned higher than an outer surface (upper surface) of the electrode terminal 116a. That is, as illustrated in FIG. 2, a height (distance) h1 of the outer surface of the external terminal 132 measured from an upper surface of the plate terminal 116b is greater than a height (distance) h2 of the outer surface of the electrode terminal 116a measured from the upper surface of the plate terminal 116b. In other words, the external terminals 132 are positioned higher than the electrode terminal 116a.

There may be various methods of making the height h1 of the outer surface of the external terminal 132 greater than the height h2 of the outer surface of the electrode terminal 116a.

According to one method, a connection member 140 couples a second portion of the second circuit module 130, which is electrically coupled to at least one of the external terminals 132, to the cap plate 116 of the bare cell 110. In this case, the connection member 140 is coupled to the plate terminal 116b of cap plate 116 through a connection bolt 142. The connection member 140 is accordingly electrically coupled to the second electrode tab 112e and the second electrode 112b of the bare cell 110. Therefore, the second portion of the second circuit module 130 is electrically connected to the second electrode 112b of the bare cell 110.

The connection member 140 may have a bent portion in order to maintain the second circuit module 130 at a constant distance from an outer surface (upper surface) of the plate terminal 116b of the cap plate 116 of the bare cell 110. Accordingly, the height h1 of the outer surface of the external terminal 132 is maintained to be greater than the height h2 of the outer surface of the electrode terminal 116a.

According to another method, a first insulating tape 150 is disposed between the second circuit module 130 and the plate terminal 116b of the cap plate 116 of the bare cell 110. The first insulating tape 150 has a sufficient thickness to fill the space between the second circuit module 130 and the plate terminal 116b of the cap plate 116 of the bare cell 110. Therefore, the height h1 of the outer surface of the external terminal 132 is maintained to be greater than the height h2 of the outer surface of the electrode terminal 116a.

At least one of the aforementioned two methods may be used to make the height h1 of the outer surface of the external terminal 132 greater than the height h2 of the outer surface of the electrode terminal 116a.

In other words, in order to make the height h1 greater than the height h2, one of the connection member 140 and the first insulating tape 150 having a sufficient thickness may be used, or both of the connection member 140 and the first insulating tape 150 may be used together. In the case that only the first insulating tape 150 is used without the connection member 140, the second portion of the second circuit module 130 may be electrically connected to the plate terminal 116b through other means such as a wire.

Since all of the heights of the outer surfaces of the external terminals 132 is greater than the height h2 of the outer surface of the electrode terminal 116a using the above methods, electrically connecting the external terminals 132 to external devices is facilitated. That is, when a top cover 190, which will be described later, covers the first and second circuit modules 120 and 130, the external terminals 132 are disposed in the lower portions or insides of openings 192 of the top cover 190, and therefore, the external terminals 132 are exposed through the openings 192.

The first insulating tape 150 may be a double-sided adhesive insulating tape that attaches the second circuit module 130 to the outer surface (upper surface) of the cap plate 116.

A second insulating tape 160 may be disposed between the first circuit module 120 and the cap plate 116. The second insulating tape 160 attaches the first circuit module 120 to the outer surface of the cap plate 116 of the bare cell 110, and insulates the first circuit module 120 from the plate terminal 116b of the cap plate 116.

The first and second circuit modules 120 and 130 are respectively disposed on opposite sides of the electrode terminal 116a, and are attached to the bare cell 110 through the second insulating tape 160 and one of the first insulating tape 150 and the connection member 140, respectively. Therefore, the distances between the first and second circuit modules 120 and 130 and the bare cell 110 is minimized, which also minimizes the size of the secondary battery 100, particularly, the height of the secondary battery 100.

The first circuit module 120 is electrically connected to the electrode terminal 116a through a first connection tab 170, which is electrically connected to the electrode terminal 116a. In FIGS. 1 and 2, the first connection tab 170 is shown to be mechanically connected to both of the first circuit module 120 and the second circuit module 130. But, the first connection tab 170 may be electrically connected only to the first circuit module 120, but may not be electrically connected to the second circuit module 130.

That is, although the first connection tab 170 may be mechanically connected to both of the first and second circuit modules 120 and 130, the first connection tab 170 is electrically connected to the first circuit module 120, but is electrically insulated from the second circuit module 130.

The first circuit module 120 is electrically connected to a first portion of the second circuit module 130 through a second connection tab 180, which is arranged to be spaced apart from the first connection tab 170.

The second portion of the second circuit module 130 is electrically connected to the plate terminal 116b of the bare cell 110 through the connection member 140. The connection member 140 is electrically and mechanically connected to the plate terminal 116b of the bare cell 110 through the connection bolt 142, and is electrically and mechanically connected to the second circuit module 130 through a process such as soldering.

The electrode terminal 116a is electrically connected to the first circuit module 120 through the first connection tab 170, and the first circuit module 120 is electrically connected to the first portion of the second circuit module 130 through the second connection tab 180. The first and second portions of the second circuit module 130 form terminals of the battery 100, and may be respectively connected to at least one of designated external terminals 132.

For example, when the secondary battery 100 is being discharged, one type (positive or negative) of polarity of the battery 100 is connected to an external device through the first electrode 112a in the bare cell 110, the electrode terminal 116a, the first connection tab 170, the first circuit module 120, the second connection tab 180, the first portion of the second circuit module 130, and designated external terminals 132. Another type of polarity of the battery 100 is connected to the external device through designated external terminals 132, the connection member 140, plate terminal 116b, and the second electrode 112b of the bare cell 110.

The secondary battery 100 includes the top cover 190, a label 194, and a bottom cover 196.

The top cover 190 includes a cover plate 190a facing the first circuit module 120 and the second circuit module 130, and a cover sidewall 190b extending from the cover plate 190a. The cover plate 190a includes the openings 192 that expose the external terminals 132 disposed on the second circuit module 130. The top cover 190 accommodates the first and second circuit modules 120 and 130, and is disposed on the upper portion of the bare cell 110.

The top cover 190 is designed such that the external terminals 132 are exposed out of the openings 192, and are in close fit with the openings 192. Therefore, a height h3 of the top cover 190, measured from the upper surface of the plate terminal 116b, may be substantially the same as a sum of the height h1 of the outer surface of the external terminals 132 and the thickness of the cover plate 190a of the top cover 190.

Thus, the secondary battery 100 including the first circuit module 120 and the second circuit module 130 minimizes the distances between the bare cell 110 and protection circuit modules, i.e., between the bare cell 110 and the first and second circuit modules 120 and 130, thus minimizing the size of the secondary battery 100, particularly, the height thereof.

The label 194 is attached to an outer surface of the bare cell 110 to surround the side surfaces of the can 114.

The bottom cover 196 surrounds the lower portion of the bare cell 110 to protect the bare cell 110.

According to the above embodiment, the secondary battery includes the two discrete circuit modules to minimize the distances between the bare cell and the circuit modules, thus minimizing the size of the secondary battery, particularly, the height thereof.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:
1. A secondary battery, comprising:
a bare cell including an electrode terminal disposed to supply electricity, the bare cell comprising:
an electrode assembly including a first electrode, a second electrode, and a separator disposed between the first and second electrodes;
a can accommodating the electrode assembly;
a cap plate disposed on the electrode assembly, the cap plate including the electrode terminal and a plate terminal electrically insulated from the electrode terminal, the electrode terminal being electrically connected to the first electrode, the plate terminal being electrically connected to the second electrode; and
a secondary protective device electrically connected between the first electrode and the electrode terminal;

a first circuit module disposed on an upper surface of the bare cell, the first circuit module being disposed at a first side of the electrode terminal;

a second circuit module disposed on the upper surface of the bare cell, the second circuit module being disposed at a second side of the electrode terminal;

a protection circuit module mounted on the first circuit module; and an external terminal mounted on the second circuit module, the external terminal protruding farther from said bare cell than the electrode terminal.

2. The secondary battery as claimed in claim 1, further comprising a connection member coupling the second circuit module to the plate terminal of the cap plate.

3. The secondary battery as claimed in claim 2, wherein the connection member maintains a gap between the second circuit module and the plate terminal.

4. The secondary battery as claimed in claim 1, further comprising a first insulating tape disposed between the second circuit module and the upper surface of the bare cell.

5. The secondary battery as claimed in claim 4, wherein the first insulating tape attaches the second circuit module to the upper surface of the bare cell.

6. The secondary battery as claimed in claim 4, wherein the first insulating tape maintains a gap between the second circuit module and the upper surface of the bare cell.

7. The secondary battery as claimed in claim 1, further comprising a second insulating tape disposed between the first circuit module and the upper surface of the bare cell.

8. The secondary battery as claimed in claim 7, wherein the second insulating tape attaches the first circuit module to the upper surface of the bare cell.

9. A secondary battery, comprising:
  a bare cell including an electrode terminal disposed to supply electricity, the bare cell comprising:
    an electrode assembly including a first electrode, a second electrode, and a separator disposed between the first and second electrodes;
    a can accommodating the electrode assembly;
    a cap plate disposed on the electrode assembly, the cap plate including the electrode terminal and a plate terminal electrically insulated from the electrode terminal, the electrode terminal being electrically connected to the first electrode, the plate terminal being electrically connected to the second electrode; and
    a secondary protective device electrically connected between the first electrode and the electrode terminal;
  a first circuit module disposed on an upper surface of the bare cell, the first circuit module being disposed at a first side of the electrode terminal;
  a second circuit module disposed on the upper surface of the bare cell, the second circuit module being disposed at a second side of the electrode terminal;
  a protection circuit module mounted on the first circuit module;
  an external terminal mounted on the second circuit module; and
  a first connection tab electrically connecting the first circuit module to the electrode terminal.

10. The secondary battery as claimed in claim 9, further comprising a second connection tab electrically connecting the first circuit module to the second circuit module, the second connection tab being spaced apart from the first connection tab.

11. The secondary battery as claimed in claim 9, further comprising a connection member coupling the second circuit module to the plate terminal of the cap plate.

12. The secondary battery as claimed in claim 11, wherein the connection member maintains a gap between the second circuit module and the upper surface of the bare cell.

13. The secondary battery as claimed in claim 9, further comprising a first insulating tape disposed between the second circuit module and the upper surface of the bare cell.

14. The secondary battery as claimed in claim 13, wherein the first insulating tape attaches the second circuit module to the upper surface of the bare cell.

15. The secondary battery as claimed in claim 13, wherein the first insulating tape maintains a gap between the second circuit module and the upper surface of the bare cell.

16. The secondary battery as claimed in claim 9, further comprising a second insulating tape disposed between the first circuit module and the upper surface of the bare cell.

17. The secondary battery as claimed in claim 16, wherein the second insulating tape attaches the first circuit module to the upper surface of the bare cell.

18. The secondary battery as claimed in claim 9, further comprising a connection member coupling the second circuit module to the plate terminal of the cap plate and to one of the first connection tab and the second connection tab, the external terminal protruding farther from said bare cell than the electrode terminal.

* * * * *